United States Patent
Jang (10) Patent No.: US 7,694,929 B2
(45) Date of Patent: Apr. 13, 2010

(54) STAND FOR DISPLAY DEVICE (75) Inventor: Woon Geun Jang, Daegu-si (KR)

(73) Assignee: LG Electronics Inc., Seoul (KR)

( * ) Notice: Subject to any disclaimer, the term of this patent is extended or adjusted under 35 U.S.C. 154(b) by 757 days.

(21) Appl. No.: 11/482,823

(22) Filed: Jul. 10, 2006

(65) Prior Publication Data
US 2007/0047186 A1     Mar. 1, 2007

(30) Foreign Application Priority Data
Aug. 10, 2005   (KR) .................. 10-2005-0073058

(51) Int. Cl.
*A47G 29/00*     (2006.01)
*F16M 11/04*     (2006.01)
(52) U.S. Cl. .................. 248/372.1; 248/585; 248/917; 248/919; 248/922; 361/679.06; 361/679.02
(58) Field of Classification Search .......... 248/372.1, 248/284.1, 292.13, 917, 919, 922, 584, 585, 248/587; 361/679.06, 679.22, 679.59, 679.05, 361/679.02
See application file for complete search history.

(56) References Cited

U.S. PATENT DOCUMENTS

| | | | | |
|---|---|---|---|---|
| 6,695,274 B1 * | 2/2004 | Chiu | .................. | 248/371 |
| 6,822,857 B2 * | 11/2004 | Jung et al. | ............. | 361/679.02 |
| 7,061,753 B2 * | 6/2006 | Michoux et al. | ....... | 361/679.05 |
| 7,404,233 B2 * | 7/2008 | Lu et al. | ................ | 16/302 |
| 7,413,152 B1 * | 8/2008 | Chen | .................. | 248/176.1 |
| 7,431,254 B2 * | 10/2008 | Cheng | .................. | 248/292.12 |
| 7,494,104 B2 * | 2/2009 | Baek | .................. | 248/372.1 |
| 7,497,408 B2 * | 3/2009 | Lim et al. | ............ | 248/284.1 |
| 7,506,853 B2 * | 3/2009 | Sweere et al. | ........ | 248/295.11 |
| 7,513,468 B2 * | 4/2009 | Jung et al. | ............ | 248/133 |
| 2003/0223188 A1 | 12/2003 | Ha et al. | | |
| 2005/0088808 A1 | 4/2005 | Michoux et al. | | |
| 2005/0247832 A1 | 11/2005 | Cho et al. | | |

FOREIGN PATENT DOCUMENTS

EP       1 382 897 A2     1/2004

* cited by examiner

*Primary Examiner*—Anita M King
(74) *Attorney, Agent, or Firm*—Birch, Stewart, Kolasch & Birch, LLP (57) ABSTRACT

There is provided a stand for a display device. The stand includes a base unit supporting the display device. A main link unit is hinged between the display device and the base unit. A pair of auxiliary links is eccentrically connected to hinges of the main link unit at different positions. A torsion spring includes at least one end connected to the pair of auxiliary links for applying an elastic force to the pair of auxiliary links. The main link unit has a smaller thickness, and thus the size of the stand can be reduced. The stand allows for convenient and smooth operation of the display device. Further, since the spring has a simple structure, the stand can be manufactured through a simple process with less cost. Furthermore, the outer appearance of the stand can be simple.

26 Claims, 10 Drawing Sheets

STAND FOR DISPLAY DEVICE

BACKGROUND OF THE INVENTION

1. Field of the Invention

The present invention relates to a stand for a display device, and more particularly, to a stand for a display device having an enhanced elastic member for the stand so as to be provided with a small main link and to be smoothly movable.

2. Description of the Related Art

A typical stand for a display device includes a base unit placed on a horizontal surface and a main link connecting the base unit to a monitor main body of the display device. The main link has a lower end rotatably supported by a pair of brackets fixed to the base unit, and an upper end connected to the monitor main body and allowing adjustment of the monitor main body to a desired tilting angle.

A recent stand further includes a auxiliary link that facilitates unfolding of the main link. Generally, the auxiliary link includes two parallel link members and a tension spring (also referred to as a spring) disposed between the two link members.

The function of the spring will now be described. When the stand is place on a horizontal surface in an upright position, the shape of the spring is not changed. However, when the stand is folded, the spring is stretched. Thus, when the stand is unfolded, the link members of the auxiliary link are pulled toward each other by the elastic force of the spring, thereby rapidly returning the stand to the upright position.

As mentioned above, the spring formed on the auxiliary link is generally disposed between the link members. The spring has a thickness of at least 1 cm to exert a tension force when the stand is unfolded.

Further, the link members of the auxiliary link must be thicker than the spring in order to stably support the spring. Therefore, the thickness of the main link is disadvantageously thick since the auxiliary link is thick.

Furthermore, since the spring installed on the auxiliary link is thick, the stand is not smoothly unfolded.

SUMMARY OF THE INVENTION

Accordingly, the present invention is directed to a stand for a display device that substantially obviates one or more problems due to limitations and disadvantages of the related art.

An object of the present invention is to provide a stand for a display device, the stand having a thin main link unit and a thin auxiliary link unit.

Another object of the present invention is to provide a stand for a display device, the stand having a main link unit operating smoothly.

A further another object of the present invention is to provide a stand for a display device, the stand having a simple auxiliary link unit such that the stand can be manufactured through a simple process with less cost.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a stand for a display device, the stand including: a base unit supporting the display device; a main link unit hinged between the display device and the base unit; a pair of auxiliary links eccentrically connected to hinges of the main link unit at different positions; and a torsion spring including at least one end connected to the pair of auxiliary links for applying an elastic force to the pair of auxiliary links.

In another aspect of the present invention, there is provided a stand for a display device, the stand including: a base unit placed on a floor; a main link unit including a first hinge connected to the display device and a second hinge connected to the base unit; a pair of auxiliary links eccentrically connected to the first hinge and the second hinge at different positions, the pair of auxiliary links changing in relative positions thereof when the main link unit rotates; and a spring applying a force to change the relative positions of the pair of auxiliary links, wherein the spring includes at least one end connected to the pair of auxiliary links and rotatable with the pair of auxiliary links, and a body fixed with respect to the main link unit.

In a further another aspect of the present invention, there is provided a stand for a display device, the stand including: a base unit placed on a floor; a main link unit including a first hinge connected to the display device and a second hinge connected to the base unit; a pair of auxiliary links eccentrically connected to the first hinge and the second hinge at different positions, the pair of auxiliary links changing in relative positions thereof when the main link unit rotates; and a spring having at least one end that is connected to the pair of auxiliary links and rotatable with the pair of auxiliary links, for changing the relative positions of the pair of auxiliary links, wherein the spring includes at least one arm extending in a direction substantially crossing an extending direction of the pair of auxiliary links.

According to the present invention, the size of the stand, especially, the thickness of the main link unit can be reduced, and the folding and unfolding actions of the main link unit can be smoothly carried out. Further, the stand can be simply manufactured with less material cost. Thus, users can conveniently use the stand.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

First Embodiment

Figure 1:
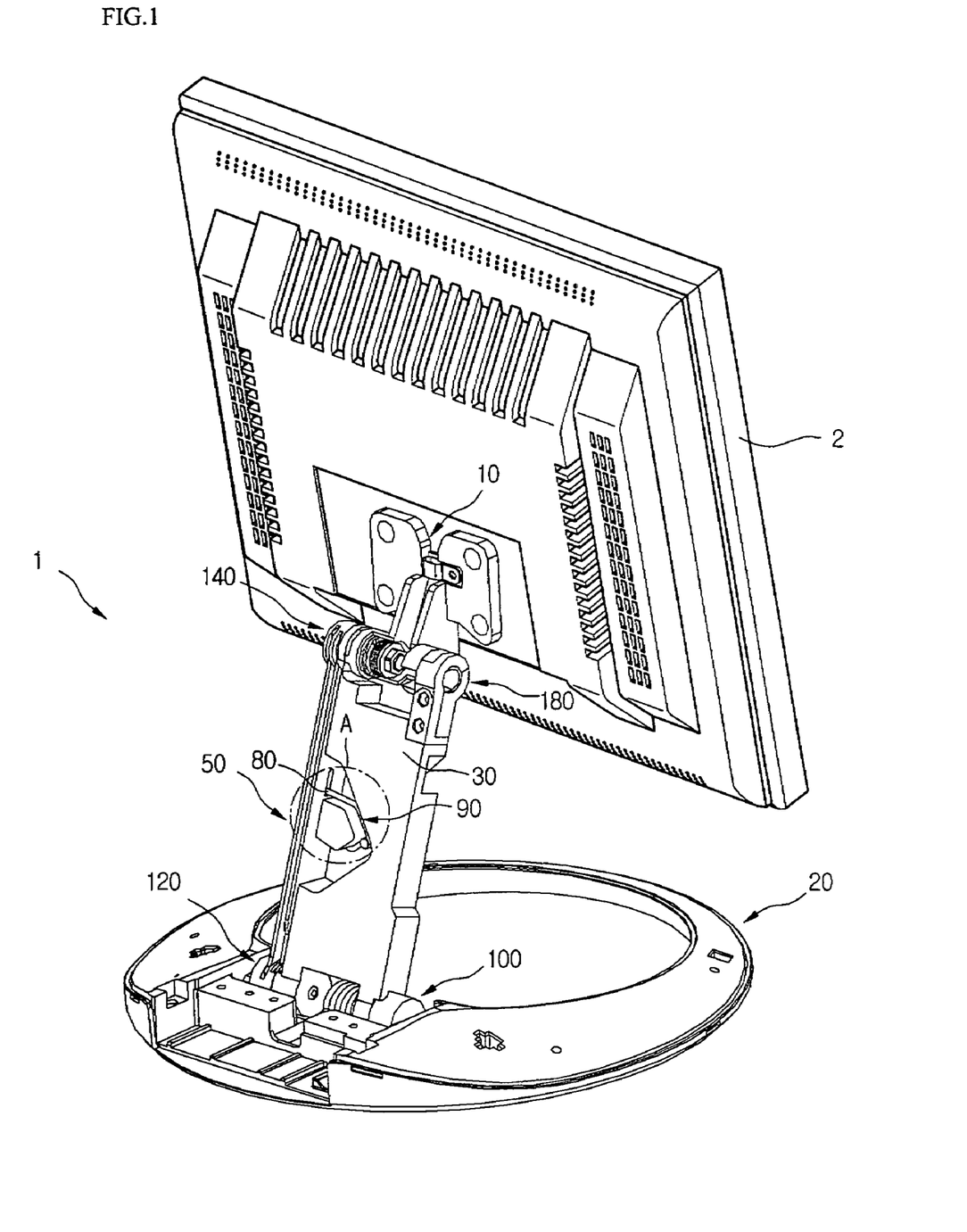
FIG. 1 is a rear perspective view of a stand installed on a display device according to a first embodiment of the present invention.

FIG. 1 is a rear perspective view of a stand 1 installed on a display device according to a first embodiment of the present invention.

Referring to FIG. 1, the stand 1 includes a supporting unit 10 fixed to a rear surface of a display device 2 such as a liquid crystal display (LCD) monitor for supporting the display device 2, a base unit 20 for placing the display device 2 on a floor, and a main link 30 rotatably connected between the supporting unit 10 and the base unit 20.

The stand 1 further includes a auxiliary link unit 50 connected between the supporting unit 10 and the base unit 20 beside the main link 30, and a torsion spring 80 installed on the auxiliary link unit 50. The torsion spring 80 includes a center portion accommodated in a torsion spring receiving portion 90 formed in one side of the main link unit 30.

In detail, the supporting unit 10 is rotatably connected to the main link unit 30 by a first link hinge 180 and a second link hinge 140. The main link unit 30 is rotatably connected to the base unit 20 by a first base hinge 100 and a second base hinge 120. Here, a friction force by the link hinges 140 and 180 is larger than a friction force by the base hinges 100 and 120. Therefore, when a user applies a predetermined force to the display device 2, the display device 2 is translated rather than being rotated. Such translation of the display device 2 is allowed by a mechanism configured by the link hinges 140 and 180, the base hinges 100 and 120, and a four-bar linkage structure, namely a quadric crank mechanism, of the auxiliary link unit 50. If the user further applies a force to the display device 2, the display device 2 is rotated on the link hinges 140 and 180. Thus, the tilting angle of the display device 2 can be adjusted.

Figure 2:
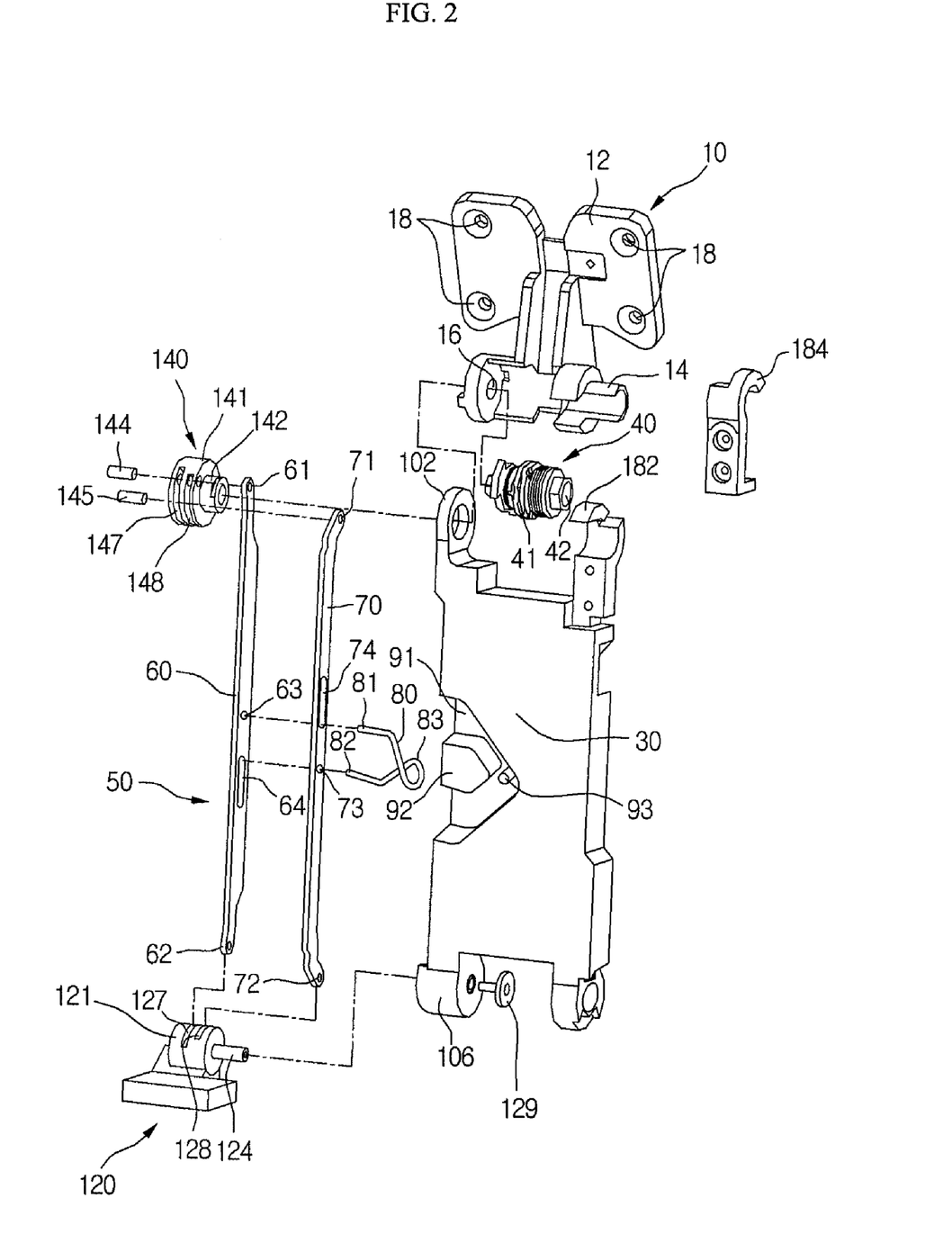
FIG. 2 is an exploded perspective view of the stand, showing a supporting unit, a main link unit, a auxiliary link unit, and a torsion spring according to the present invention.

The auxiliary link unit 50 includes a pair of parallel auxiliary links: a first auxiliary link 60 and a second auxiliary link 70 (referred to FIG. 2). Both ends of the auxiliary links 60 and 70 are connected to the second link hinge 140 and the second base hinge 120, respectively. One end of the torsion spring 80 is fixed to one of the auxiliary links 60 and 70, and the other end of the torsion spring 80 is fixed to the other of the auxiliary links 60 and 70.

Both ends of the torsion spring 80 are fixed to the auxiliary link unit 50, and a center portion of the torsion spring 80 extends toward the main link unit 30. The center portion of the torsion spring 80 is accommodated in the torsion spring receiving portion 90 formed in the main link unit 30. The center portion of the torsion spring 80 is wound to form a hole, and a spring fixing protrusion 93 (refer to FIG. 2) formed on the torsion spring receiving portion 90 of the main link unit 30 is inserted into the hole. The torsion spring 80 will be more fully described later.

FIG. 2 is an exploded perspective view of the stand 1, showing the supporting unit 10, the main link unit 30, the auxiliary link unit 50, and the torsion spring 80.

Referring to FIG. 2, the supporting unit 10 includes a monitor supporting plate 12 to be fixed to the rear surface of the display device 2. The monitor supporting plate 12 includes a plurality of monitor coupling holes 18. Fasteners such as screws are coupled to the monitor coupling holes 18 for fixing the monitor supporting plate 12 to the rear surface of the display device 2. The monitor supporting plate 12 includes a first hinge shaft 14 formed on one side of a lower portion and a second hinge hole 16 formed in the other side of the lower portion.

When assembled, the first hinge shaft 14 is inserted into a first hinge receiving portion 182 formed on one side of an upper end of the main link unit 30, and a first hinge coupling member 184 is coupled to the first hinge receiving portion 182. In this way, the one side of the lower portion of the monitor supporting plate 12 is rotatably fixed to the main link 30.

Meanwhile, a second hinge spring member 40 is inserted into the second hinge hole 16. The second hinge spring member 40 includes a second hinge spring 41 allowing for tilting of the supporting unit 10, and a second hinge shaft 42 forming a hinge shaft of the second link hinge 140. The second hinge shaft 42 is inserted into the second hinge hole 16.

One end of the second hinge shaft 42 is inserted through a second hinge shaft receiving portion 102 formed on the other side of the upper end of the main link unit 30 and then coupled to a second link supporting shaft 142 extending from a second auxiliary link supporting part 141 of the second link hinge 140.

Meanwhile, the two auxiliary links 60 and 70 include through-holes 61 and 71 in one ends. The one ends of the two auxiliary links 60 and 70 are inserted into second auxiliary link receiving portions 147 and 148 of the second link hinge 140, respectively.

Second auxiliary link fixing pins 144 and 145 are coupled to the second auxiliary link receiving portions 147 and 148 to rotatably fix the two auxiliary links 60 and 70 to the second auxiliary link supporting part 141.

The other ends of the two auxiliary links 60 and 70 include through-holes 62 and 72, respectively. The other ends of the auxiliary links 60 and 70 are inserted into first auxiliary link receiving portions 127 and 128 of the second base hinge 120.

First auxiliary link fixing pins (not shown) are inserted into the through-holes 62 and 72 to rotatably fix the two auxiliary links 60 and 70 to a first auxiliary link supporting part 121.

The first auxiliary link supporting part 121 is formed on the second base hinge 120 that is provided for rotatably fixing the main link unit 30 to the base unit 20. The second base hinge 120 includes a second base hinge shaft receiving portion 124 formed on an inner side of the first auxiliary link supporting part 121.

The second base hinge shaft receiving portion 124 is inserted into a second base hinge receiving portion 106 formed on one side of a lower end of the main link unit 30, and then a second base hinge shaft 129 is coupled to the second base hinge shaft receiving portion 124. In detail, the second base hinge shaft 129 is inserted into the second base hinge receiving portion 106 from an inner side of the main link unit 30, and then coupled to the second base hinge shaft receiving portion 124.

Meanwhile, the two auxiliary links 60 and 70 extend in one direction. Preferably, the two auxiliary links 60 and 70 extend in parallel with the length direction of the main link unit 30. The two auxiliary links 60 and 70 are disposed a predetermined distance from the main link unit 30.

The torsion spring 80 is installed on the auxiliary link unit 50 in a predetermined manner according to the present invention. This will now be more fully described.

Figure 3:
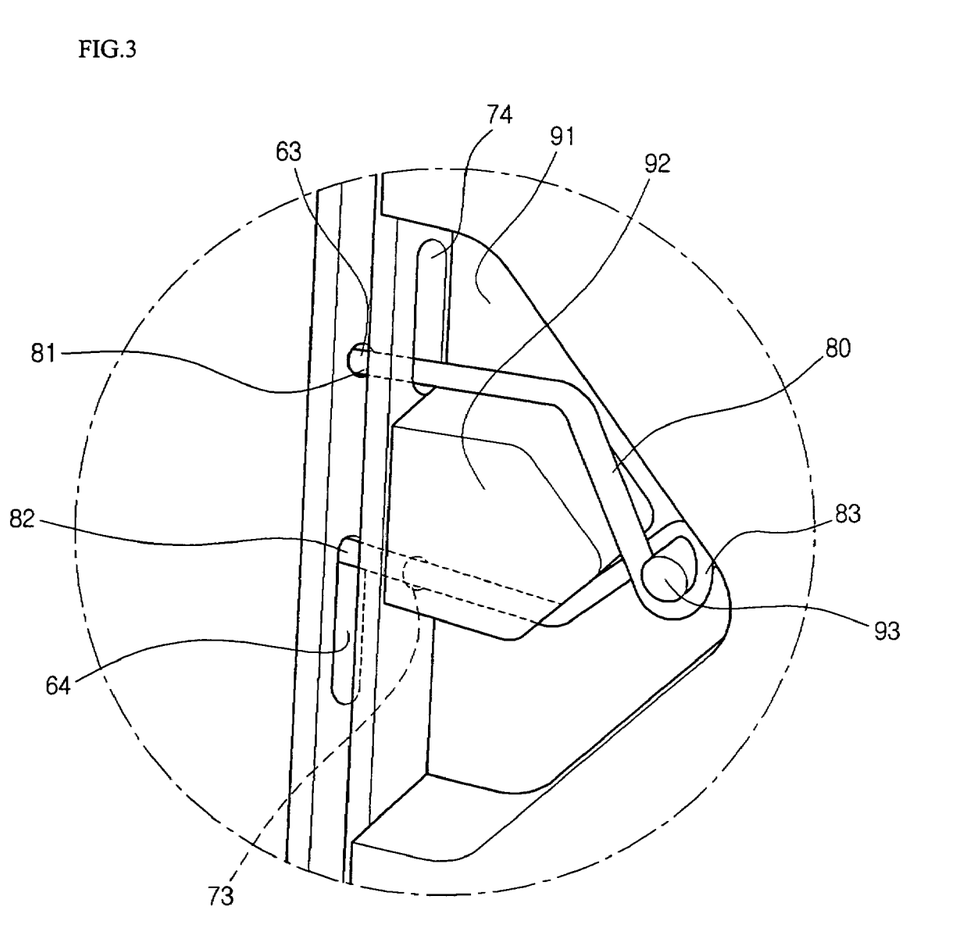
FIG. 3 is an enlarged view of portion A of FIG. 1.

FIG. 3 is an enlarged view of portion A of FIG. 1 to show the auxiliary link unit 50 and the torsion spring 80 coupled to the auxiliary link unit 50.

Referring to FIGS. 2 and 3, the first auxiliary link 60 and the second auxiliary link 70 of the auxiliary link unit 50 include spring coupling holes 63 and 73 in center portions for coupling with the torsion spring 80, and spring guide portions 64 and 74 for guiding deformation of the torsion spring 80.

In detail, the spring coupling hole 63 of the first auxiliary link 60 is formed at a position spaced a predetermined distance from a center of the first auxiliary link 60 in an upward direction, and the spring guide portion 64 of the first auxiliary link 60 is spaced a predetermined distance from the center of the first auxiliary link 60 in a downward direction. In the current embodiment, preferably, the spring coupling hole 63 has a slightly larger diameter than one end of the torsion spring 80 inserted into the spring coupling hole 63.

The spring guide portion 64 of the first auxiliary link 60 has a long slot shape with a width slightly larger than that of the other end of the torsion spring 80, such that the other end of the torsion spring 80 can be inserted into the spring guide portion 64 and slidable in the spring guide portion 64. The spring guide portion 64 and the spring coupling hole 63 are spaced a predetermined distance from each other. The distance between the spring guide portion 64 and the spring coupling hole 63 corresponds to the distance between one end and the other end of the torsion spring 80.

The spring guide portion 74 of the second auxiliary link 70 is formed at a position spaced a predetermined distance from a center of the second auxiliary link 70 in an upward direction, and the spring coupling hole 73 of the second auxiliary link 70 is spaced a predetermined distance from the center of the second auxiliary link 70 in a downward direction.

Preferably, the spring guide portion 74 of the second auxiliary link 70 is overlapped with the spring coupling hole 63 of the first auxiliary link 60. In detail, it is preferable that a lower end of the spring guide portion 74 of the second auxiliary link 70 be aligned with the spring coupling hole 63 of the first auxiliary link 60 when the main link unit 30 is in a standing position.

Further, it is preferable that the spring coupling hole 73 of the second auxiliary link 70 be overlapped with the spring guide portion 64 of the first auxiliary link 60. In detail, it is preferable that the spring coupling hole 73 of the second auxiliary link 70 be aligned with an upper end of the spring guide portion 64 of the first auxiliary link 60 when the main link unit 30 is in the standing position.

In other words, when the main link unit 30 is in the standing position, the spring coupling hole 63 is aligned with an inner end of the spring guide portion 74, and the spring coupling hole 73 is aligned with an inner end of the spring guide portion 64.

Here, the term "inner end" is defined based on the center of the auxiliary links 60 and 70. Hereinafter, the term "inner end" will be used for the spring guide portions 64 and 74 to denote one end adjacent to the center of the auxiliary links 60 and 70, and the term "outer end" will be used for the spring guide portions 64 and 74 to denote the other end spaced away from the center of the auxiliary links 60 and 70.

Consequently, in the auxiliary links 60 and 70, the spring coupling holes 63 and 73 and the spring guide portions 64 and 74 are formed to receive the torsion spring 80.

The coupling of the torsion spring 80 to the auxiliary link unit 50 will now be more fully described from a lower end of the torsion spring 80.

A lower end 82 of the torsion spring 80 extends from the second auxiliary link 70 through the spring guide portion 64 of the first auxiliary link 60 and the spring coupling hole 73 of the second auxiliary link 70. Then, the lower end 82 is upwardly bent at a predetermined angle and further extends. The center portion of the torsion spring 80 is wound at least one time to form a spring center hole 83.

The torsion spring 80 extends from the spring center hole 83 upwardly away from the main link unit 30. Then, the torsion spring 80 is bent downwardly and extends through the first auxiliary link 70 and the second auxiliary link 60.

Here, an upper end 81 of the torsion spring 80 extending from the spring center hole 83 passes through the spring guide portion 74 of the second auxiliary link 70 and the spring coupling hole 63 of the first auxiliary link 60, and then further extends from the first auxiliary link 60 outwardly. Preferably, both ends 81 and 82 of the torsion spring 80 are parallel with each other. However, other relationships between both ends 81 and 82 of the torsion spring 80 may be allowable according to the present invention.

The spring center hole 83 of the torsion spring 80 is located in the torsion spring receiving portion 90 formed in the main link unit 30. The torsion spring receiving portion 90 includes a spring operation region 91 and the spring fixing protrusion 93.

In detail, the spring operation region 91 is a groove formed in a side of the main link unit 30. The spring operation region 91 starts from a side of the main link unit 30 facing the spring guide portion 74 of the second auxiliary link 70, and turns at a center portion of the main link unit 30.

After turning at the center portion of the main link unit 30, the spring operation region 91 extends to a side of the main link unit 30 facing the guide portion 64 of the first auxiliary link 60. Referring again to FIG. 3, the spring operation region 91 has a substantially pentagonal shape with a base aligned with a side edge of the main link unit 30.

Meanwhile, it is preferable that the depth of the spring operation region 91 be equal to or larger than the thickness of the torsion spring 80 to prevent the torsion spring 80 from extending from the main link unit 30. However, in the case where the torsion spring 80 extends from the main link unit 30, the torsion spring will function in the same way.

Further, it is preferable that the opened ends of the spring operation region 91 have a width equal to or larger than the width of the spring guide portions 64 and 74 for preventing interference when the torsion spring 80 operates. In other words, it is preferable that the spring operation region 91 be sufficiently wide for allowing stretching and compression of the torsion spring 80.

The spring fixing protrusion 93 is fitted into the spring center hole 83 of the torsion spring 80 for fixing the position of the torsion spring 80. The width of the spring operation region 91 may be minimal at the spring fixing protrusion 93.

Meanwhile, the torsion spring receiving portion 90 includes a spring mount 92 in the spring operation region 91. The torsion spring 80 is fitted around the spring mount 92. Preferably, an upper surface of the spring mount 92 may be flush with an upper surface of the main link unit 30. Compression limit of the torsion spring 80 can be determined by the spring mount 92, and thus rotation limit of the auxiliary link unit 50 can be determined by the spring mount 92.

The operation or function of the torsion spring 80 will now be described in detail with reference to the accompanying drawings.

Figure 4:
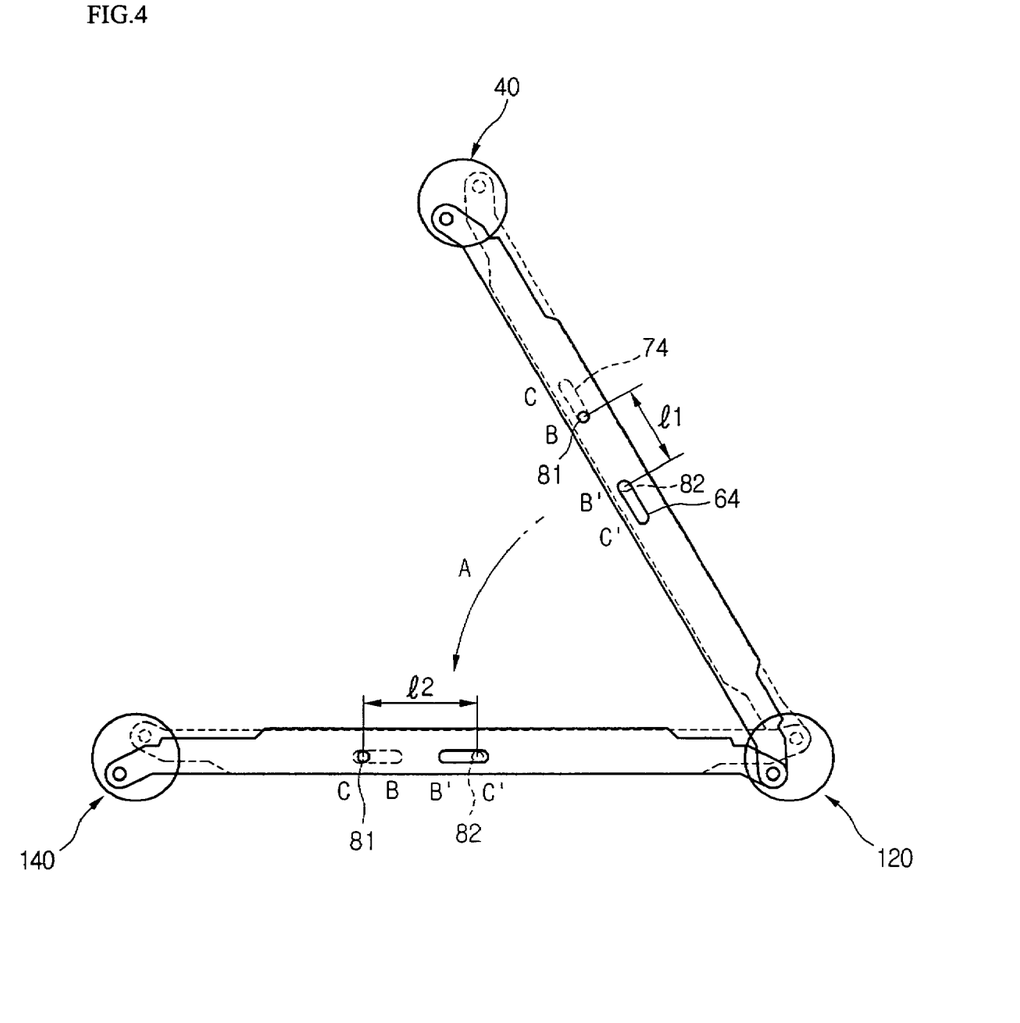
FIG. 4 is a side view of the stand, showing stretching of the torsion spring disposed between the auxiliary link unit and the main link unit during movement of the main link from a standing position to a folded position according to the present invention.
Figure 5:
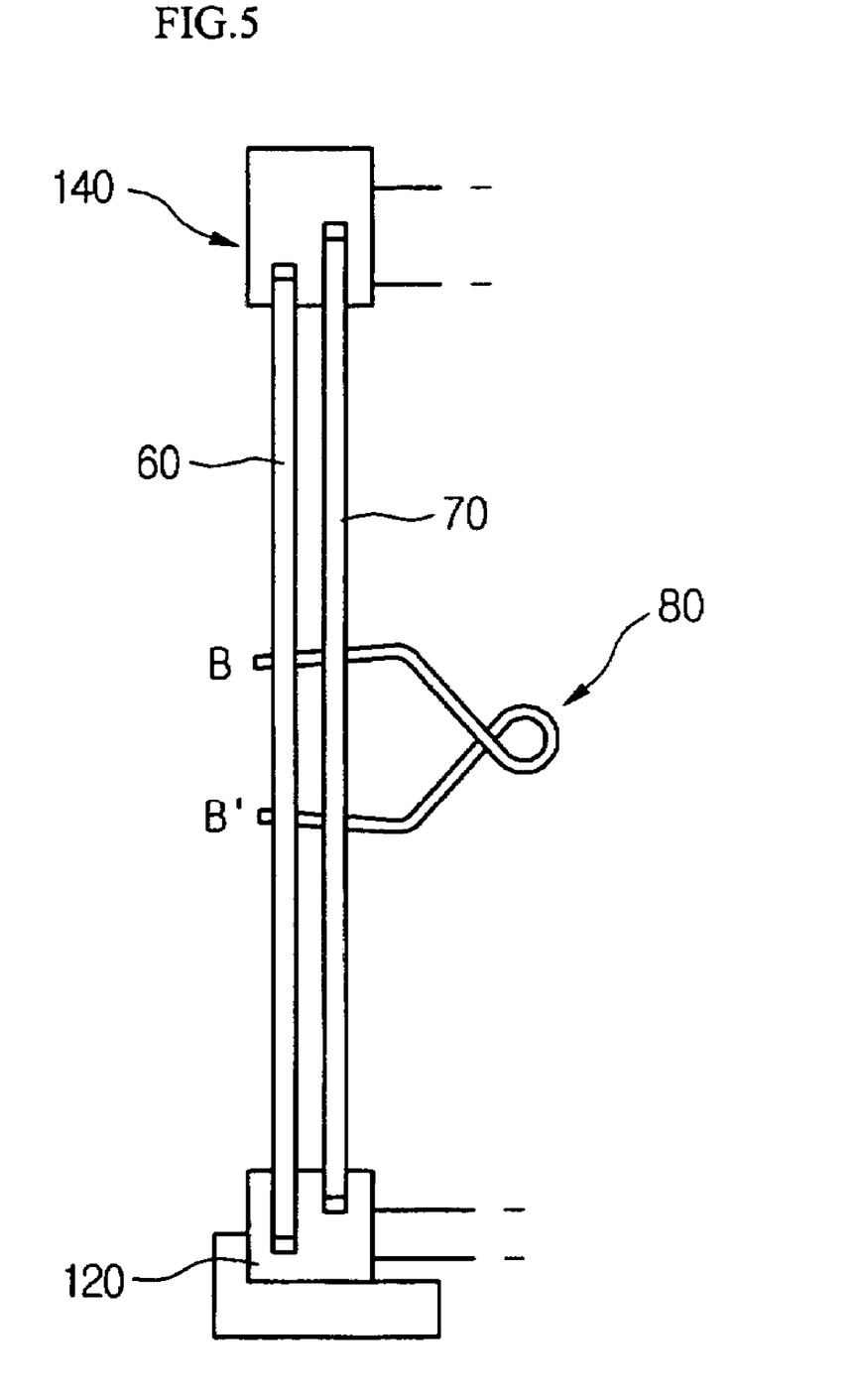
FIG. 5 is a partial front view of the stand, showing the auxiliary link unit and the torsion spring when the main link is in a standing position.
Figure 6:
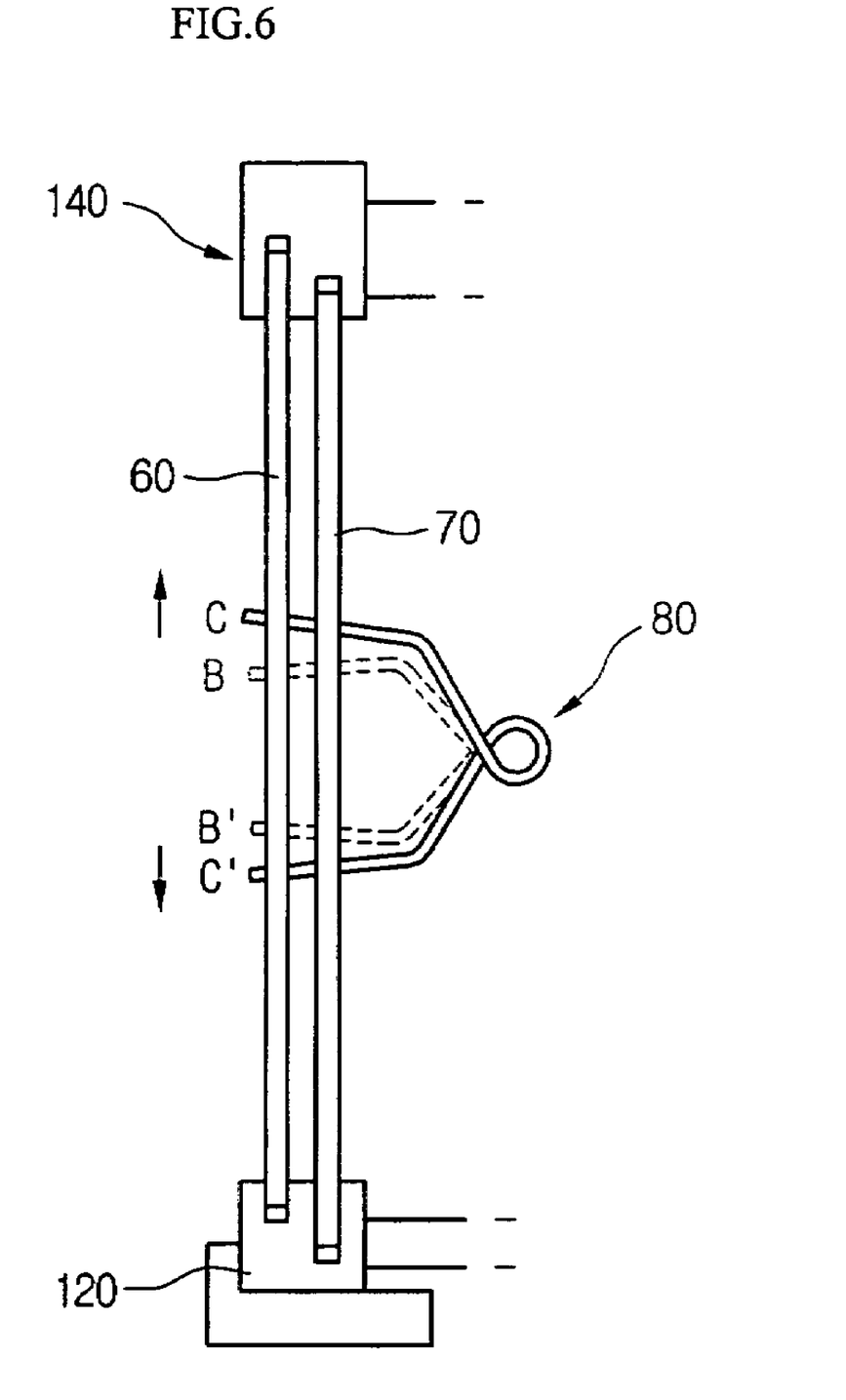
FIG. 6 is a partial front view of the stand, showing the auxiliary link unit and the torsion spring deformed when the main link is in a folded position.

FIG. 4 is a side view of the stand 1, showing stretching of the torsion spring 80 disposed between the auxiliary link unit 50 and the main link unit 30 during movement of the main link 30 from a standing position to a folded position according to the present invention, FIG. 5 is a partial front view of the stand 1, showing the auxiliary link unit 50 and the torsion spring 80 when the main link 30 is in the standing position, and FIG. 6 is a partial front view of the stand 1, showing the auxiliary link unit 50 and the torsion spring 80 deformed when the main link is in the folded position. In FIG. 6, the original shape of the torsion spring 80 is denoted by dashed line to distinctly illustrate stretching of the torsion spring 80 during the movement of the main link unit 30 from the standing position to the folded position.

The function of the torsion spring 80 will now be described in detail with reference to FIGS. 4 to 6.

First, referring to FIGS. 4 and 5, when the main link unit 30 is in a standing position, the shape of the torsion spring 80 is not changed. In this state, the torsion spring 80 has a minimum width L1 and exerts a minimum elastic force.

Here, one end 81 of the torsion spring 80 is positioned in an inner end (B) of the spring guide portion 74 of the second auxiliary link 70, and the other end 82 of the torsion spring 80 is positioned in an inner end (B') of the spring guide portion 64 of the first auxiliary link 60.

When a user rotates the main link unit 30 in the direction of arrow (A) to fold the stand 1, the first and second auxiliary links 60 and 70 are rotated together with the main link unit 30. Here, the first and second 60 and 70 are rotated about different axes.

Referring to FIGS. 4 and 6, when the main link unit 30 is rotated, the spring coupling hole 63 of the first auxiliary link 60 relatively moves along the spring guide portion 74 of the second auxiliary link 70 toward an outer end (C) of the spring guide portion 74, and the spring coupling hole 73 of the second auxiliary link 70 relatively moves along the spring guide portion 64 of the first auxiliary link toward an outer end (C') of the spring guide portion 64.

Therefore, the one end 81 of the torsion spring 80 moves outwardly along the spring guide portion 74 of the second auxiliary link 70, and the other end 82 of the torsion spring 80 moves outwardly along the spring guide portion 64 of the first auxiliary link 60.

When the main link 30 is completely folded to the base unit 20, the torsion spring 80 extends to a maximum width L2 and exerts an elastic force. After that, the stand 1 can be returned to a standing position from the folded position by the elastic force of the stretched torsion spring 80.

Here, when the main link unit 30 is completely rotated to the folded position (i.e., when the main unit 30 is parallel with a floor), the main link unit 30 is latched in the folded position using a fixing unit (not shown).

Here, the ends 81 and 82 of the torsion spring 80 is positioned at the outer ends (C) and (C') of the spring guide portions 74 and 64, respectively. In this position, the torsion spring 80 have the maximum width L2 and exerts the maximum elastic force.

Meanwhile, even when the main link unit 30 is folded or unfolded, the center portion of the torsion spring 80 does not move relative to the main link unit 30 since the spring fixing protrusion 93 of the main link unit 30 is inserted into the spring center hole 83 of the torsion spring 80.

When the main link unit 30 is unlatched from the folded position, the elastic force of the torsion spring 80 returns the main link unit 30 to the standing position. Here, the ends 81 and 82 of the torsion spring 80 moves inwardly from the outer ends (C) and (C') of the auxiliary link unit 50 to the inner ends (B) and (B'). When the main link unit 30 is in its fully standing position, both ends 81 and 82 of the torsion spring is positioned at the inner ends (B) and (B') of the auxiliary link unit 50, respectively.

As explained above, according to the present invention, the torsion spring 80 is used to return the main link unit 30, instead of the tension spring used in the related art.

The torsion spring 80 can have a significantly small thickness when compared with the tension spring of the related art. In the related art, the tension spring is wound about the length direction of the main link unit and extends in parallel with the extending direction of the main link unit. However, the torsion spring 80 is wound about an axis perpendicular to the length direction of the main link unit 30, and the spring arms (both ends 81 and 82) of the torsion spring 80 extend in a direction perpendicular the length direction of the auxiliary link unit 50. Therefore, the torsion spring 80 can be much thinner than the tension spring of the related art as described above. Here, although the extending direction of the spring arms of the torsion spring 80 is not limited to the perpendicular direction to the length direction of the auxiliary link unit 50 (that is, the spring arms of the torsion spring 80 can be crossed with the auxiliary link unit 50 at any angle), it is preferable that the spring arms of the torsion spring 80 be crossed with the auxiliary link unit 50 to maximize the elastic force of the torsion spring 80. Thus, the torsion spring 80 having a much smaller thickness than the tension spring of the related art can be used for the auxiliary link unit 50 in the present invention.

As a result, the auxiliary link unit 50 supporting the torsion spring 80 can have a small thickness and the main link unit 30 on which the auxiliary link unit 50 is installed can have a small thickness.

In other words, although the torsion spring 80 is much thinner than the tension spring of the related art, the torsion spring 80 performs the same function as the tension spring. Thus, the auxiliary link unit 50 supporting the torsion spring 50 can have a much smaller thickness, and the main link unit 30 on which the auxiliary link unit 50 is installed can have a much smaller thickness. The smaller main link unit 30 allows for more smooth operation of the stand 1.

Second Embodiment

In the second embodiment of the present invention, the stand has the same structure as in the first embodiment, except for the structure and shape of the torsion spring. Thus, descriptions of the same structure and elements will be omitted.

Figure 7:
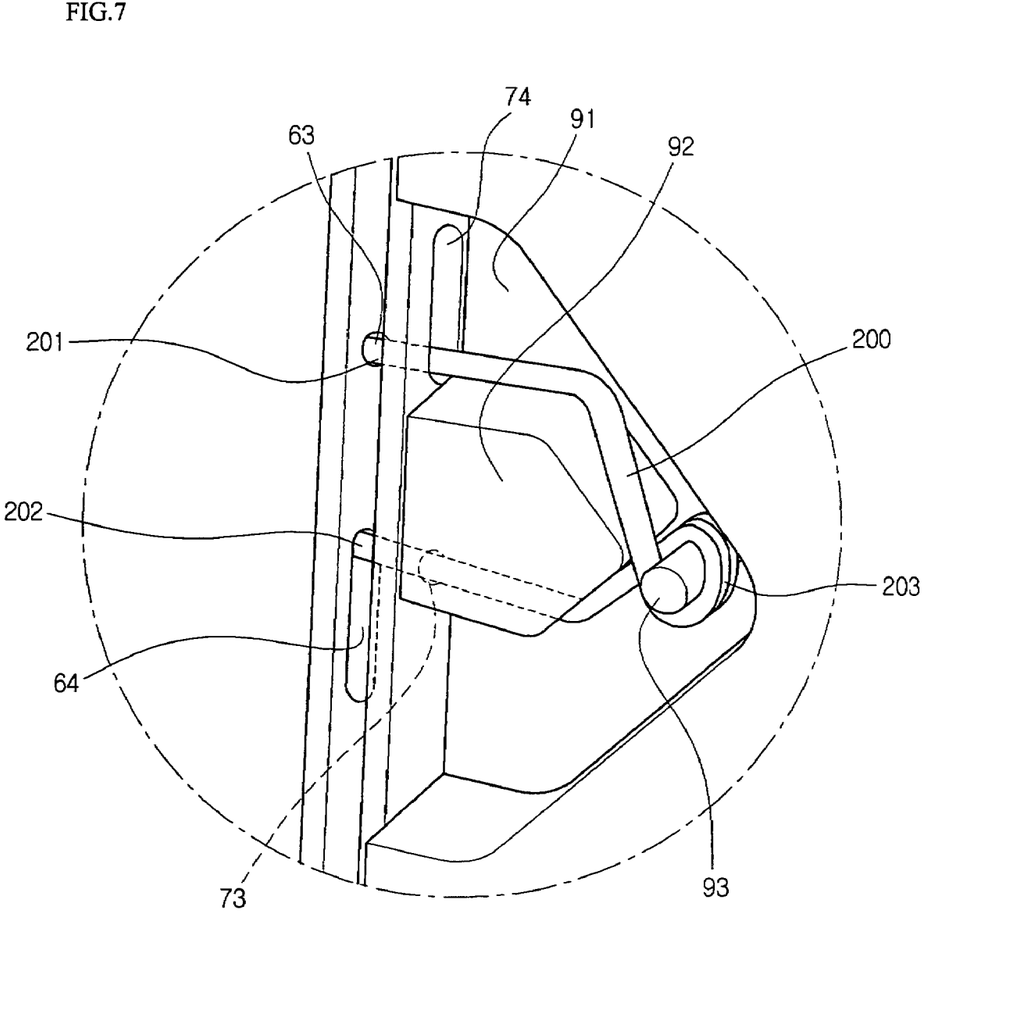
FIG. 7 is an enlarged view showing a torsion spring and a neighboring structure in a stand according to a second embodiment of the present invention.

FIG. 7 is an enlarged view showing a torsion spring 200 of a stand and a neighboring structure of the torsion spring 200 according to the second embodiment of the present invention.

Referring to FIG. 7, the shape and structure of the torsion spring 200 are different from those of the torsion spring 80 of the first embodiment. In detail, the torsion spring 200 has ends 201 and 202 that are coupled to a auxiliary link unit in the same manner as in the first embodiment. However, the torsion spring 200 includes a wound portion 203 corresponding to a portion around the center hole 83 of the torsion spring 80 of the first embodiment. The wound portion 203 of the torsion spring 200 is formed by winding the center portion of the torsion spring 200 two or more times. Owing to the wound portion 203, the torsion spring 200 can exert an elastic force more smoothly and evenly.

The wound portion 203 enables the torsion spring 200 to exert an elastic force more strongly and smoothly. Therefore, the operation of the torsion spring 200 can be smoothened.

Third Embodiment

In the third embodiment of the present invention, the stand has the same structure as in the first embodiment, except for the structure and shape of the torsion spring and the torsion spring supporting structure. Thus, descriptions of the same structure and elements will be omitted.

Figure 8:
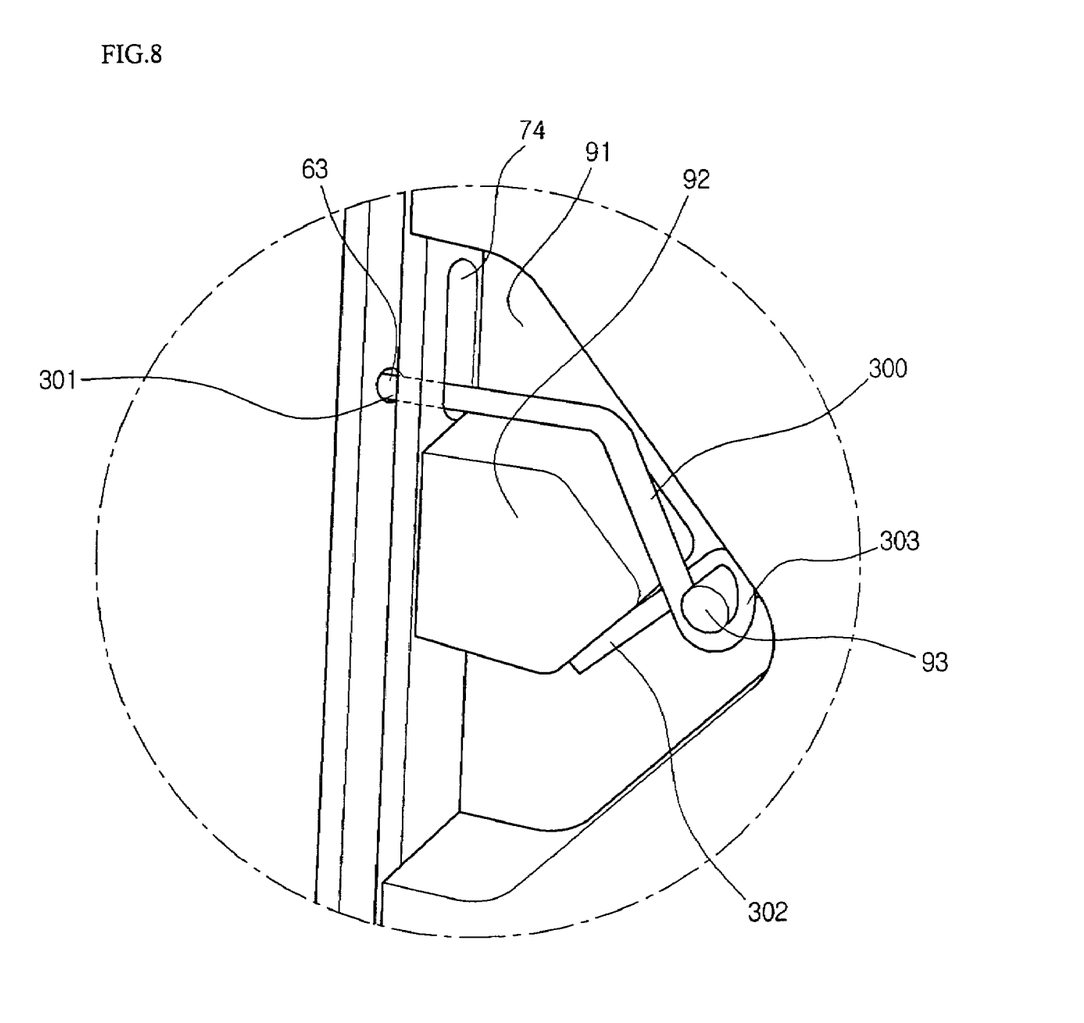
FIG. 8 is an enlarged view showing a torsion spring and a neighboring structure in a stand according to a third embodiment of the present invention.

FIG. 8 is an enlarged view showing a torsion spring 300 and a neighboring structure in a stand according to the third embodiment of the present invention.

Referring to FIG. 8, the structure of the torsion spring 300 is different from that of the torsion spring 80 of the first embodiment. In detail, the torsion spring 300 has one end 301 and a center hole 303 that are coupled to a auxiliary link unit in the same manner as in the first embodiment. However, the torsion spring 300 includes the other end 302 that is supported by a lower portion of a spring mount 92 but not connected or coupled to the auxiliary link unit. The other end 302 of the torsion spring 300 does not move when the one end 301 is outwardly pushed. That is, the other end 302 of the torsion spring 300 only supports movement of the one end 301 of the torsion spring 300.

In this case, when the display device 2 is folded, the torsion spring 300 is stretched half as much as the torsion spring of the first embodiment. Therefore, plastic deformation of the torsion spring 300 can be prevented, and the manufacturing cost of the torsion spring 300 reduces since the torsion spring 300 has a simple structure. It will be apparent to those of skill in the art that the torsion spring 300 must have a larger spring constant than the torsion spring 80 of the first embodiment.

In the current embodiment, although the other end 302 of the torsion spring 300 is supported by the spring mount 92, the present invention is not limited to this structure. The other end 302 of the torsion spring 300 can be supported using other structures. For example, the other end 302 of the torsion spring 300 can be fixed by inserting the other end 302 into a hole formed in a spring operation region 91.

Fourth Embodiment

In the fourth embodiment of the present invention, the stand has the same structure as in the first embodiment, except for the structure of the torsion spring and the torsion spring supporting structure. Thus, descriptions of the same structure and elements will be omitted.

Figure 9:
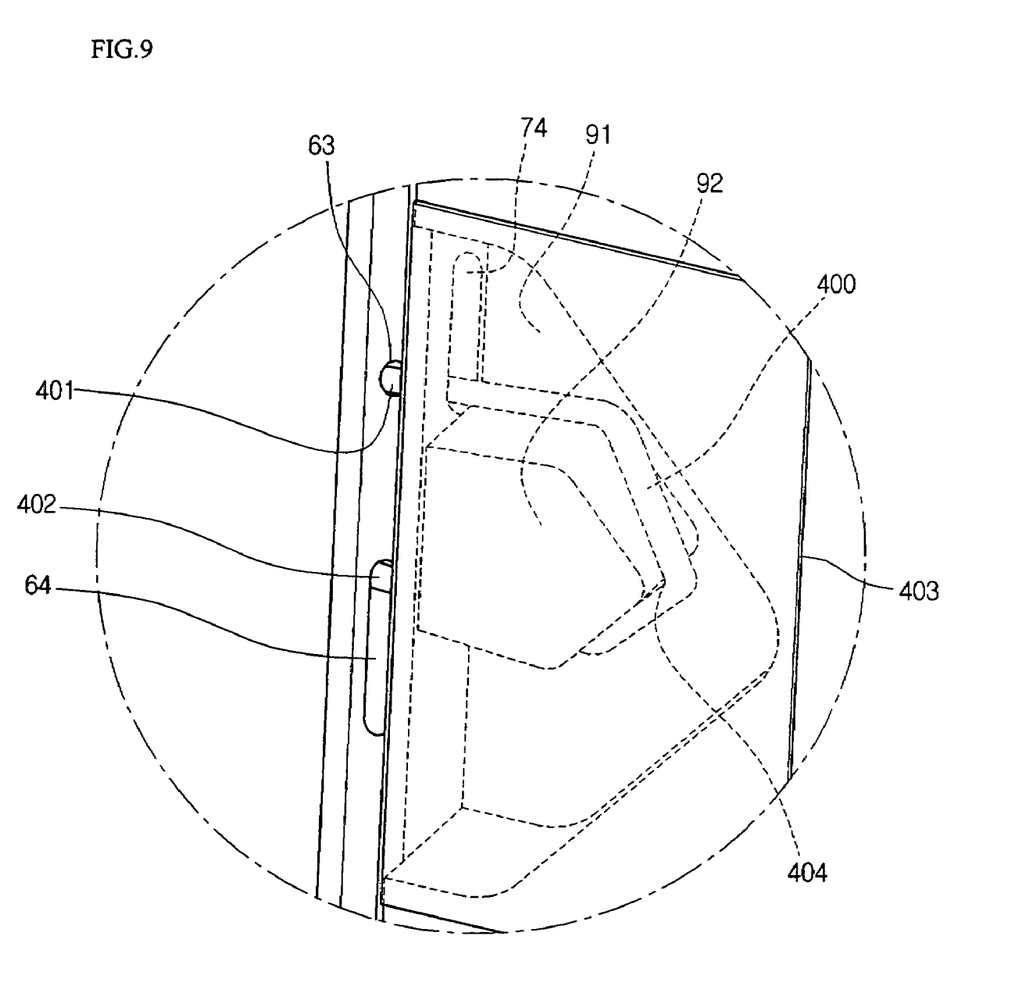
FIG. 9 is an enlarged view showing a torsion spring and a neighboring structure in a stand according to a fourth embodiment of the present invention.

FIG. 9 is an enlarged view showing a torsion spring 400 and a neighboring structure in a stand according to the fourth embodiment of the present invention.

Referring to FIG. 9, the structure of the torsion spring 400 is different from that of the torsion spring 80 of the first embodiment. In detail, the torsion spring 400 has ends 401 and 402 that are coupled to a auxiliary link unit in the same manner as in the first embodiment. However, the torsion spring 400 has a different structure and is fixed to a main link unit in a different way.

In more detail, the torsion spring 400 is disposed in a spring operation region 91 and held in the spring operation region 91 by a cover 403. The cover 403 protects the torsion spring 400 from foreign substances. Further, the cover 403 increases the cosmetic appearance of the stand. Unlike the torsion spring 80 of the first embodiment, the torsion spring 400 does not include a center hole 83. Instead, the torsion spring 400 includes a central bent portion 404 where the elastic deformation of torsion spring 400 mainly occurs. The central bent portion 404 can be called an elastic deformation portion. An elastic force can be easily obtained from the elastic deformation portion 404 of the torsion spring 400. The torsion spring 400 may belong to one of wire forming springs.

In the current embodiment, since the thickness of the spring operation region 91 can be reduced, the sizes of the main link unit and the auxiliary link unit can also be reduced.

Meanwhile, a typical torsion spring can be installed inside the cover 403. In this case, the typical torsion spring can be stably accommodated without separation.

Fifth Embodiment

In the fifth embodiment of the present invention, the stand has the same structure as in the first embodiment, except for the installing direction of the torsion spring. Thus, descriptions of the same structure and elements will be omitted.

Figure 10:
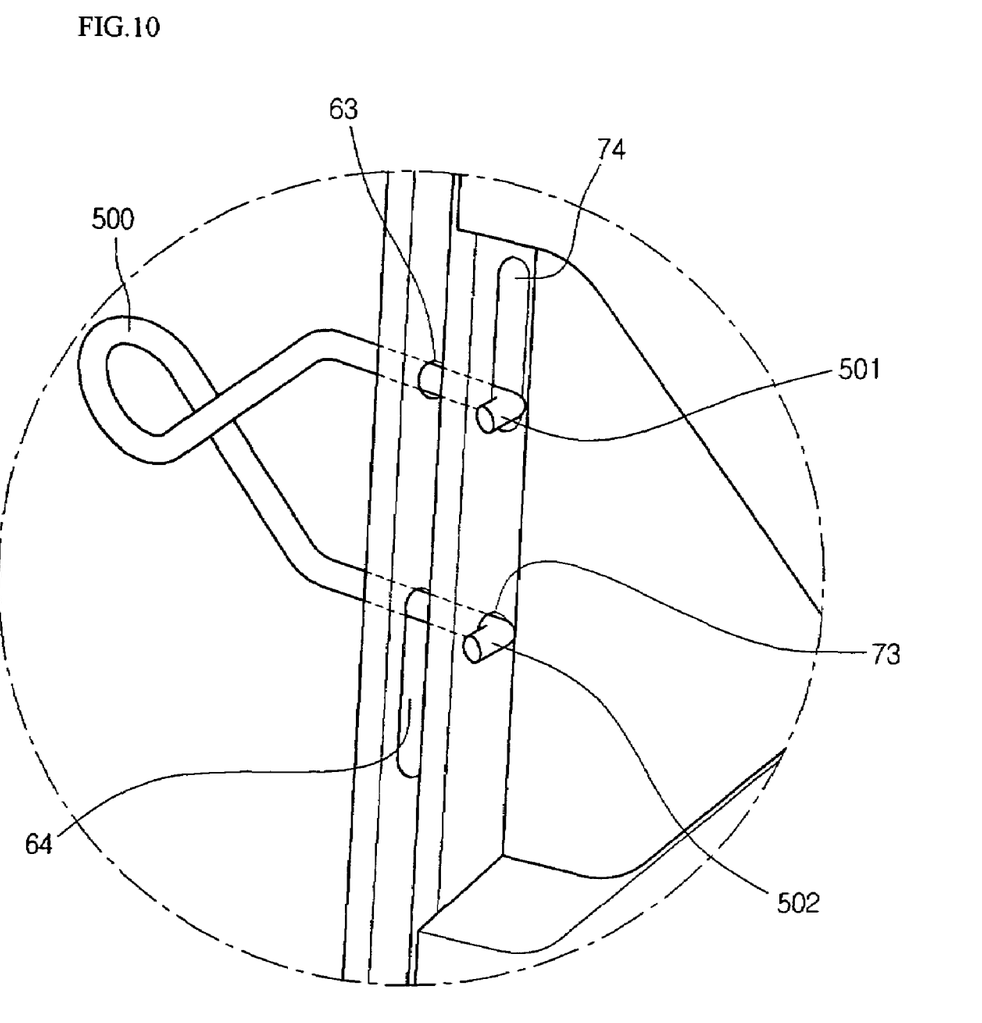
FIG. 10 is an enlarged view showing a torsion spring and a neighboring structure in a stand according to a fifth embodiment of the present invention.

FIG. 10 is an enlarged view showing a torsion spring 500 and a neighboring structure in a stand according to a fifth embodiment of the present invention.

Referring to FIG. 10, unlike the torsion spring 80 of the first embodiment, the torsion spring 500 extends away from a main link unit instead of extending into the main link unit. The torsion spring 500 includes ends 501 and 502 that are coupled to the auxiliary link unit in generally the same way as in the first embodiment, except that the ends 501 and 502 are bent so as to retain the torsion spring 500 to the auxiliary link unit.

In the current embodiment, it will be apparent to those of skill in the related art that the auxiliary link unit is operated using the torsion spring 500 in the same way as in the previous embodiments.

As described above with reference to the accompanying drawings in which exemplary embodiments of the present invention are shown, the torsion spring installed on the auxiliary link unit of the stand is designed to be much thinner than the tension spring of the related art, so that the main link unit on which the auxiliary link unit is installed can have a smaller thickness. Therefore, the size of the stand can be reduced.

Further, since the main link unit has a smaller thickness and the torsion spring installed on the auxiliary link unit exerts the same elastic force as the tension spring of the related art, so that the stand can be operated conveniently and smoothly.

Furthermore, since the tension spring has a simple structure, the tension spring and other parts can be manufactured by simple processes with less cost, and the outside appearance of the stand can be simplified.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A stand for a display device, comprising:
 a base unit for supporting the display device;
 a main link unit hinged to the base unit;
 a pair of auxiliary links eccentrically connected to hinges of the main link unit at different positions; and
 a torsion spring including at least one end connected to the pair of auxiliary links for applying an elastic force to the pair of auxiliary links, wherein the torsion spring comprises a center portion guided by the main link unit.

2. The stand according to claim 1, wherein the torsion spring comprises two ends connected to the pair of auxiliary links, respectively.

3. The stand according to claim 1, wherein one of the pair of auxiliary links comprises a spring guide portion for guiding one end of the torsion spring, and the other of the pair of auxiliary links comprises another spring guide portion for guiding the other end of the torsion spring.

4. The stand according to claim 1, wherein the main link unit comprises a spring fixing protrusion for guiding the center portion of the torsion spring extending from a side of the pair of auxiliary links.

5. The stand according to claim 1, wherein the torsion spring comprises a center hole for fixing a position of the torsion spring with respect to the main link unit.

6. The stand according to claim 1, wherein the end of the torsion spring exert a force on one of the pair of auxiliary links while being guided by the other of the pair of auxiliary link.

7. The stand according to claim 1, wherein the main link unit comprises a spring operation region recessed based on a deformation trace of the torsion spring.

8. The stand according to claim 1, wherein the main link unit comprises a spring mount for determining a compression limit of the torsion spring.

9. A stand for a display device, comprising:
 a base unit placed on a floor;
 a main link unit including a first hinge connected to the display device and a second hinge connected to the base unit;
 a pair of auxiliary links eccentrically connected to the first hinge and the second hinge at different positions, the pair of auxiliary links changing in relative positions thereof when the main link unit rotates; and
 a spring applying a force to change the relative positions of the pair of auxiliary links,
 wherein the spring includes at least one end connected to the pair of auxiliary links and moveable with the pair of auxiliary links, and a body fixedly located with respect to the main link unit.

10. The stand according to claim 9, wherein the spring is a torsion spring.

11. The stand according to claim 9, wherein the main link unit comprises a spring fixing protrusion for keeping the spring at a fixed position with respect to the main link unit.

12. The stand according to claim 9, wherein the end of the spring is supported by the main link unit.

13. The stand according to claim 9, wherein the spring is a wire forming spring.

14. The stand according to claim 9, wherein the main link unit comprises a cover for covering a portion of the main link unit where the spring is placed.

15. The stand according to claim 9, wherein the spring extends in a direction perpendicular to an extending direction of the pair of auxiliary links.

16. A stand for a display device, comprising:
 a base unit placed on a floor;
 a main link unit including a first hinge connected to the display device and a second hinge connected to the base unit;
 a pair of auxiliary links eccentrically connected to the first hinge and the second hinge at different positions, the pair of auxiliary links changing in relative positions thereof when the main link unit rotates; and
 a spring having at least one end that is connected to the pair of auxiliary links and movable with the pair of auxiliary links, for changing the relative positions of the pair of auxiliary links,
 wherein the spring includes at least one arm extending in a direction substantially crossing a lengthwise direction of the pair of auxiliary links.

17. The stand according to claim 16, wherein the spring is supported by a protrusion formed on the main link unit.

18. The stand according to claim 17, wherein the spring is wound around the protrusion two or more times.

19. The stand according to claim 16, wherein the arm of the spring extends toward the main link unit.

20. The stand according to claim 16, wherein the spring comprises two arms supported by the pair of auxiliary links and a center portion supported by the main link unit.

21. The stand according to claim 16, wherein the arm of the spring is supported by the main link unit.

22. The stand according to claim 16, wherein the spring is a torsion spring.

23. The stand according to claim 16, wherein the spring is a wire forming spring.

24. A stand for a display device, comprising:
 a base unit for supporting the display device;
 a main link unit hinged to the base unit;
 a pair of auxiliary links eccentrically connected to hinges of the main link unit at different positions; and
 a torsion spring including at least one end connected to the pair of auxiliary links for applying an elastic force to the pair of auxiliary links, wherein one of the pair of auxiliary links comprises a spring guide portion for slidably guiding one end of the torsion spring, and the other of the pair of auxiliary links comprises another spring guide portion for slidably guiding the other end of the torsion spring,
 wherein the torsion spring comprises a center portion guided by the main link unit.

25. The stand according to claim 24, wherein the main link unit comprises a spring fixing protrusion for guiding a center portion of the torsion spring extending from a side of the pair of auxiliary links.

26. The stand according to claim 24, wherein the torsion spring comprises a center hole for fixing a position of the torsion spring with respect to the main link unit.

* * * * *